(12) United States Patent
Tsukiji et al.

(10) Patent No.: US 12,338,355 B2
(45) Date of Patent: *Jun. 24, 2025

(54) INK JET COMPOSITION AND INK JET RECORDING METHOD

(71) Applicant: SEIKO EPSON CORPORATION, Tokyo (JP)

(72) Inventors: Nikako Tsukiji, Matsumoto (JP); Soichi Yamazaki, Shiojiri (JP); Koichi Terao, Suwa (JP); Harunobu Komatsu, Matsumoto (JP); Koji Horiba, Atsugi (JP)

(73) Assignee: SEIKO EPSON CORPORATION (JP)

( * ) Notice: Subject to any disclaimer, the term of this patent is extended or adjusted under 35 U.S.C. 154(b) by 276 days.

This patent is subject to a terminal disclaimer.

(21) Appl. No.: 17/885,736

(22) Filed: Aug. 11, 2022

(65) Prior Publication Data

US 2023/0055161 A1  Feb. 23, 2023

(30) Foreign Application Priority Data

Aug. 12, 2021  (JP) ................. 2021-131783

(51) Int. Cl.
  *C09D 11/328* (2014.01)
  *B41J 2/01* (2006.01)
  (Continued)

(52) U.S. Cl.
  CPC .............. *C09D 11/328* (2013.01); *B41J 2/01* (2013.01); *B41J 2/2107* (2013.01);
  (Continued)

(58) Field of Classification Search
  CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623;
  (Continued)

(56) References Cited

U.S. PATENT DOCUMENTS 5,614,008 A * 3/1997 Escano .................. C09D 11/30
                                                    525/437
5,958,998 A * 9/1999 Foucher ............... C09D 11/037
                                                    977/788

(Continued)

FOREIGN PATENT DOCUMENTS

EP        1669423 A1   6/2006
JP      H10-245511 A   9/1998
        (Continued)

*Primary Examiner* — Manish S Shah
(74) *Attorney, Agent, or Firm* — Harness, Dickey & Pierce, P.L.C.

(57) ABSTRACT

An ink jet composition of the present disclosure includes water; a polyester resin having sulfo groups; and a colorant, the colorant is contained in particles formed from a material containing the polyester resin, and the particles have an average particle diameter of 100 nm or less and are contained in the ink jet composition at a content rate of 15 percent by mass or more.

7 Claims, 1 Drawing Sheet

(51) Int. Cl.
- *B41J 2/21* (2006.01)
- *B41M 5/00* (2006.01)
- *B41M 7/00* (2006.01)
- *C09D 11/104* (2014.01)
- *D06P 1/52* (2006.01)
- *D06P 5/20* (2006.01)
- *D06P 5/30* (2006.01)

(52) U.S. Cl.
CPC ........ *B41M 5/0023* (2013.01); *B41M 5/0047* (2013.01); *B41M 7/009* (2013.01); *C09D 11/104* (2013.01); *D06P 1/5271* (2013.01); *D06P 5/2077* (2013.01); *D06P 5/30* (2013.01)

(58) Field of Classification Search
CPC B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | | |
|---|---|---|---|---|
| 5,973,026 | A * | 10/1999 | Burns | C09D 11/38 977/788 |
| 6,025,412 | A * | 2/2000 | Sacripante | C09D 11/32 524/460 |
| 6,046,253 | A * | 4/2000 | Erdtmann | C09D 11/326 523/160 |
| 12,091,565 | B2 * | 9/2024 | Yamazaki | C09D 11/322 |
| 2019/0367750 | A1 * | 12/2019 | Chopra | B41M 1/06 |
| 2019/0367751 | A1 | 12/2019 | Chopra et al. | |
| 2020/0308431 | A1 | 10/2020 | Yamazaki et al. | |

FOREIGN PATENT DOCUMENTS

| | | | | |
|---|---|---|---|---|
| JP | H11-188856 | A | 7/1999 | |
| JP | 2001-247788 | A | 9/2001 | |
| JP | 2003-313467 | A | 11/2003 | |
| JP | 2013-091718 | A | 5/2013 | |
| JP | 2019038191 | A * | 3/2019 | ........ B41J 2/01 |
| JP | 2019-210456 | A | 12/2019 | |
| JP | 2020-158645 | A | 10/2020 | |

* cited by examiner

INK JET COMPOSITION AND INK JET RECORDING METHOD

The present application is based on, and claims priority from JP Application Serial Number 2021-131783, filed Aug. 12, 2021, the disclosure of which is hereby incorporated by reference herein in its entirety.

BACKGROUND

1. Technical Field

The present disclosure relates to an ink jet composition and an ink jet recording method.

2. Related Art

In recent years, application of ink jet printing has been expanded, and besides application for office-use and home-use printers, the ink jet printing has also been applied to commercial printing, textile printing, and the like.

In addition, the ink jet printing has been applied not only to paper but also to various types of recording media, such as a cloth, a film, and cardboard.

In view of handleability and safety, although a water-based ink has been desired to be used, on the other hand, by a water-based ink, a sufficiently excellent coating film strength is difficult to obtain. Hence, although an ink jet ink containing a resin material has been used, when a usual polyester or the like is used, a problem in that an ejection stability by an ink jet method is degraded may occur in some cases.

In order to overcome the problem as described above, an ink jet ink containing a polyester resin having highly hydrophilic sulfo groups has been proposed (for example, see JP-A-2020-158645).

When the ink jet ink as described above is used, although the ejection stability by an ink jet method can be improved, a problem in that a color development property is degraded may arise. When a solid content concentration is increased to improve the color development property, a problem in that the ejection stability by an ink jet method is degraded may occur.

That is, there has been a problem in that the ejection stability by an ink jet method and the color development property cannot be obtained at the same time.

SUMMARY

The present disclosure is made to overcome the problem described above and can be realized as the following application examples.

An ink jet composition according to an application example of the present disclosure comprises: water; a polyester resin having sulfo groups; and a colorant, the colorant is contained in particles formed from a material containing the polyester resin, and the particles have an average particle diameter of 100 nm or less and are contained in the ink jet composition at a content rate of 15 percent by mass or more.

In addition, an ink jet composition according to another application example of the present disclosure has a viscosity of 9.0 mPa·s or less at 25° C.

In addition, in an ink jet composition according to another application example of the present disclosure, the colorant includes at least one selected from the group consisting of a sublimation dye, an oil dye, and a dispersive dye.

In addition, in an ink jet composition according to another application example of the present disclosure, the polyester resin has a sulfur atom content of 0.60 percent by atom or less.

In addition, in an ink jet composition according to another application example of the present disclosure, the particles contain at least two types of polyester resins having different sulfo-group content rates.

An ink jet recording method according to an application example of the present disclosure comprises: an ejection step of ejecting the ink jet composition of the present disclosure by an ink jet method.

In addition, an ink jet recording method according to another application example of the present disclosure further comprises, after the ejection step: a heating step of heating a recording medium to which the ink jet composition is adhered.

In addition, in an ink jet recording method according to another application example of the present disclosure, the recording medium has a temperature of 100° C. to 160° C. in the heating step.

DESCRIPTION OF EXEMPLARY EMBODIMENTS

Figure 1:
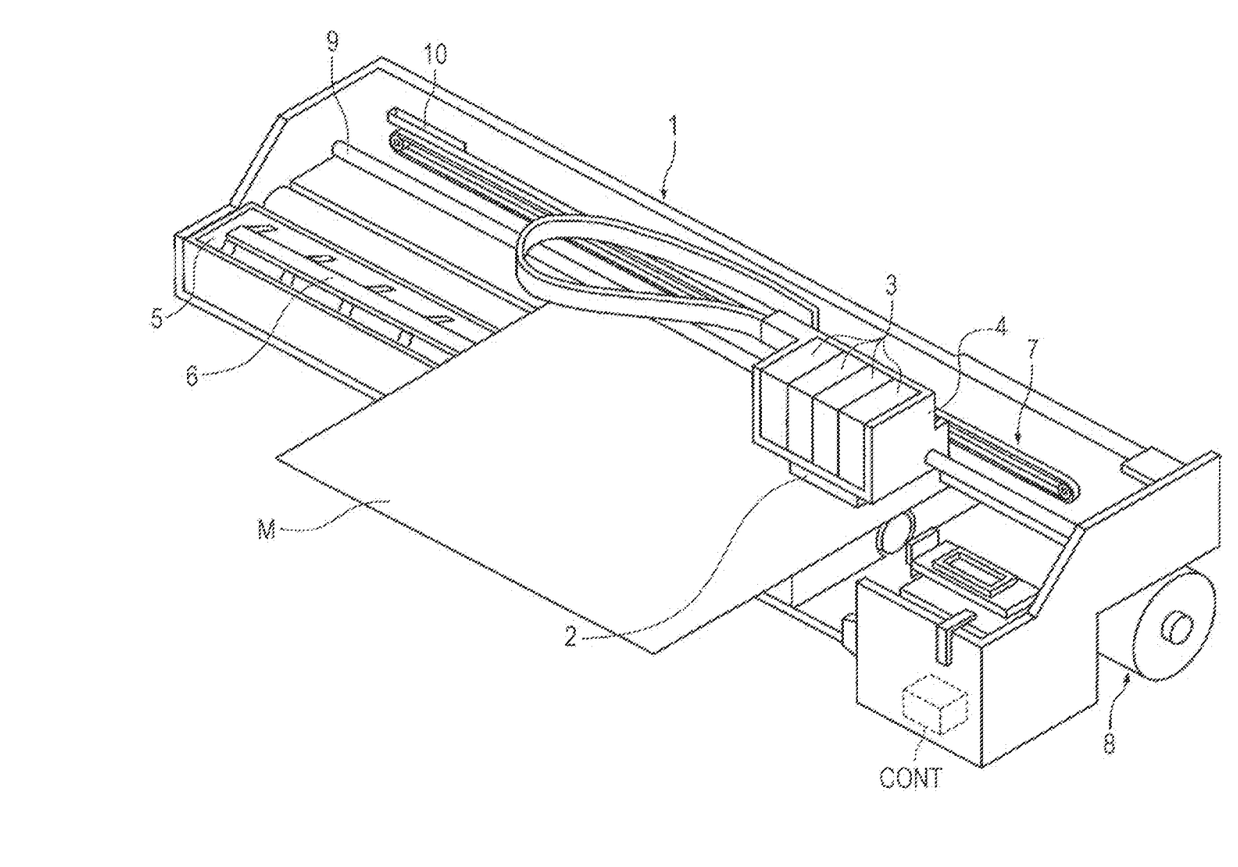
FIGURE is a schematic perspective view of a recording apparatus of a preferable embodiment.

Hereinafter, preferable embodiments of the present disclosure will be described in detail.

1. InK Jet Composition

An ink jet composition of the present disclosure includes water, a polyester resin having sulfo groups, and a colorant. In addition, the colorant is contained in particles formed from a material containing the polyester resin, and the particles have an average particle diameter of 100 nm or less and are contained in the ink jet composition at a content rate of 15 percent by mass or more.

When the conditions as described above are satisfied, an ejection stability of the ink jet composition by an ink jet method can be made excellent, and in addition, a color development property of a recorded portion by the ink jet composition can also be made excellent. In particular, an excellent color development property can be obtained on various types of recording media. In addition, a fixing property and an adhesion strength of the recorded portion to be formed using the ink jet composition can be made excellent. In addition, the ink jet composition of the present disclosure can be applied to a method for manufacturing a recorded matter including no transfer step which will be described later in detail and is preferable in terms of improvement in productivity of the recorded matter, reduction in production cost thereof, energy saving, and the like.

The reasons the excellent effects as described above can be obtained are believed as follows.

That is, since the polyester resin forming the particles has sulfo groups, and the average particle diameter of the particles is sufficiently small, a hydrophilic property of the particles can be made excellent, and in addition, fluidity of the particles in the ink jet composition can be made excellent. As a result, a dispersion stability of the particles in the ink jet composition and the ejection stability of the ink jet composition by an ink jet method can be made excellent. In addition, since the polyester resin forming the particles has sulfo groups, and the average particle diameter of the particles is sufficiently small, the effects as described above can be obtained; hence, even when the content rate of the particles in the ink jet composition is high as described above, the ejection stability of the ink jet composition can be made sufficiently excellent. Accordingly, it is believed that a solid content amount in the ink jet composition can be sufficiently increased, and the ejection stability of the ink jet composition by an ink jet method and the color development property of the recorded portion by the ink jet composition can be obtained at the same time. In addition, when the average particle diameter of the particles is sufficiently small as described above, a rate of the solid content contained in a region in the vicinity of the surface of the particle can be increased, and the color development property of the recorded portion to be formed using the ink jet composition can be made particularly excellent.

In addition, since the colorant is applied to a recording medium while the colorant preferably colors the resin material, the fixing property of the recorded portion of the recorded matter to be manufactured can be made excellent, and the colorant can be preferably prevented, for example, from unfavorably falling from the recorded matter and can be stably held in the recorded matter. Hence, for example, even when a heat treatment, such as washing/cleaning using hot water, heat drying by a dryer, or ironing, is performed, the colorant is effectively prevented from unfavorably being scattered out of the recorded matter, and as a result, durability of the recorded matter can be made particularly excellent.

In addition, when a dye is contained as the colorant, the effects as described above can be more significantly obtained.

On the other hand, when the conditions described above are not satisfied, satisfactory results cannot be obtained.

For example, when the polyester resin having sulfo groups is not included, the hydrophilic property of the particles contained in the ink jet composition cannot be sufficiently enhanced, and the ejection stability of the ink jet composition by an ink jet method is degraded.

In addition, when the average particle diameter of the particles is excessively large, the ejection stability of the ink jet composition by an ink jet method is degraded. In addition, in the particles, although a colorant having a high hydrophobic property generally tends to be localized at a central portion of the particle so as to be apart from water, when the average particle diameter of the particles is excessively large, the colorant is concentrated in the vicinity of the central portion of the particle further apart from the surface thereof, and as a result, even when the same amount of the colorant is included, the color development property of the recorded portion to be formed using the ink jet composition is degraded.

Although the average particle diameter of the particles contained in the ink jet composition of the present disclosure may be 100 nm or less as described above, the average particle diameter described above is preferably 90 nm or less, more preferably 85 nm or less, and further preferably 80 nm or less. In addition, a lower limit of the average particle diameter of the particles is preferably 5 nm, more preferably 20 nm, and further preferably 30 nm.

Accordingly, the effects as described above can be more significantly obtained.

In addition, in this specification, unless otherwise particularly noted, in a particle size distribution measured using a dynamic light scattering method, the average particle diameter indicates a particle diameter when the cumulative frequency of the particle volume from a small particle diameter side is 50% and may be obtained by measurement, for example, using a zeta-potential/particle diameter measurement system ELSZ-1000ZS (manufactured by Otsuka Electronics Co., Ltd.).

In addition, although the content rate of the particles in the ink jet composition of the present disclosure may be 15 percent by mass or more as described above, the content rate described above is preferably 18 percent by mass or more, more preferably 20 percent by mass or more, and further preferably 25 percent by mass or more. In addition, an upper limit of the content rate of the particles in the ink jet composition of the present disclosure is preferably 45 percent by mass, more preferably 40 percent by mass, and further preferably 35 percent by mass.

Accordingly, the effects as described above can be more significantly obtained.

In addition, in this specification, the ink jet composition is a concept which includes, besides an ink itself to be ejected by an ink jet method, an undiluted solution to be used for preparation of the ink. In other words, the ink jet composition of the present disclosure may be a composition itself to be ejected by an ink jet method or may be a composition to be ejected by an ink jet method after being processed by a treatment, such as dilution. As the ink jet method, for example, there may be mentioned a charge deflection method, a continuous method, or an on-demand method, such as a piezoelectric method or a bubble jet (registered trademark) method.

1-1. Water

The ink jet composition of the present disclosure includes water. The water primarily has a function to impart the fluidity to the ink jet composition and for example, functions as a dispersion medium of the particles.

As the water, for example, pure water, such as reverse osmosis (RO) water, distilled water, or ion exchange water, may be used.

Although a lower limit of a content rate of the water in the ink jet composition is not particularly limited, the lower limit described above is preferably 30.0 percent by mass, more preferably 35.0 percent by mass, and further preferably 40.0 percent by mass. In addition, although an upper limit of the content rate of the water in the ink jet composition is not particularly limited, the upper limit described above is preferably 75.0 percent by mass, more preferably 70.0 percent by mass, and further preferably 65.0 percent by mass.

Accordingly, a viscosity of the ink jet composition can be more reliably adjusted to a preferable value. In addition, the dispersion stability of the particles in the ink jet composition can be made more excellent. As a result, the ejection stability of the ink jet composition by an ink jet method can be made more excellent.

1-2. Colorant

The ink jet composition of the present disclosure includes a colorant. The colorant colors a recording medium and is a component having a significant influence on the appearance of the recorded matter.

As the colorant, for example, various types of pigments, such as organic pigments and inorganic pigments, and various types of dyes may be mentioned, and one selected from those mentioned above may be used alone, or at least two types thereof may be used in combination.

As the organic pigment, for example, there may be mentioned an azo pigment, such as an azo lake, an insoluble azo pigment, a condensed azo pigment, or a chelate azo pigment; a polycyclic pigment, such as a phthalocyanine pigment, a perylene pigment, a perinone pigment, an anthraquinone pigment, a quinacridone pigment, a dioxazine pigment, a thioindigo pigment, an isoindolinone pigment, or a quinophthalone pigment; a dye lake, such as a basic dye type lake or an acidic dye type lake; a nitro pigment, a nitroso pigment, an aniline black, or a daylight fluorescent pigment.

As the inorganic pigment, for example, a titanium oxide, an iron oxide, or a carbon black may be mentioned. As the carbon black, for example, a carbon black manufactured by a known method, such as a contact method, a furnace method, or a thermal method, may be used.

As the dye, for example, a sublimation dye, an oil dye, a dispersive dye, a fluorescent dye, a reactive dye, an acidic dye, a sulfide dye, a vat dye, or a cationic dye may be mentioned.

Among those mentioned above, a colorant containing at least one selected from the group consisting of a sublimation dye, an oil dye, and a dispersive dye is preferable.

Accordingly, the particles described above can be more preferably colored, and the color development property of the recorded portion to be formed using the ink jet composition can be made more excellent.

As the dispersive dye and the sublimation dye, for example, there may be mentioned C.I. Disperse Yellow 1, 3, 4, 5, 7, 9, 13, 23, 24, 30, 33, 34, 42, 44, 49, 50, 51, 54, 56, 58, 60, 61, 63, 64, 66, 68, 71, 74, 76, 79, 82, 83, 85, 86, 88, 90, 91, 93, 98, 99, 100, 104, 108, 114, 116, 118, 119, 122, 124, 126, 135, 140, 141, 149, 154, 160, 162, 163, 164, 165, 179, 180, 182, 183, 184, 186, 192, 198, 199, 201, 202, 204, 210, 211, 215, 216, 218, 224, 227, 231, or 232; C.I. Disperse Orange 1, 3, 5, 7, 11, 13, 17, 20, 21, 25, 29, 30, 31, 32, 33, 37, 38, 42, 43, 44, 45, 46, 47, 48, 49, 50, 53, 54, 55, 56, 57, 58, 59, 60, 61, 66, 71, 73, 76, 78, 80, 89, 90, 91, 93, 96, 97, 119, 127, 130, 139, or 142; C.I. Disperse Red 1, 4, 5, 7, 11, 12, 13, 15, 17, 27, 43, 44, 50, 52, 53, 54, 55, 56, 58, 59, 60, 65, 72, 73, 74, 75, 76, 78, 81, 82, 86, 88, 90, 91, 92, 93, 96, 103, 105, 106, 107, 108, 110, 111, 113, 117, 118, 121, 122, 126, 127, 128, 131, 132, 134, 135, 137, 143, 145, 146, 151, 152, 153, 154, 157, 159, 164, 167, 169, 177, 179, 181, 183, 184, 185, 188, 189, 190, 191, 192, 200, 201, 202, 203, 205, 206, 207, 210, 221, 224, 225, 227, 229, 239, 240, 257, 258, 277, 278, 279, 281, 288, 298, 302, 303, 310, 311, 312, 320, 324, 328, or 364; C.I. Disperse Violet 1, 4, 8, 23, 26, 27, 28, 31, 33, 35, 36, 38, 40, 43, 46, 48, 50, 51, 52, 56, 57, 59, 61, 63, 69, or 77; C.I. Disperse Green 9; C.I. Disperse Brown 1, 2, 4, 9, 13, or 19; C.I. Disperse Blue 3, 7, 9, 14, 16, 19, 20, 24, 26, 27, 35, 43, 44, 54, 55, 56, 58, 60, 62, 64, 71, 72, 73, 75, 79, 81, 82, 83, 87, 91, 92, 93, 94, 95, 96, 102, 106, 108, 112, 113, 115, 118, 120, 122, 125, 128, 130, 139, 141, 142, 143, 146, 148, 149, 153, 154, 158, 165, 167, 171, 173, 174, 176, 181, 183, 185, 186, 187, 189, 197, 198, 200, 201, 205, 207, 211, 214, 224, 225, 257, 259, 267, 268, 270, 284, 285, 287, 288, 291, 293, 295, 297, 301, 315, 330, 333, 359, or 360; or C.I. Disperse Black 1, 3, 10, or 24.

As the oil dye, for example, there may be mentioned C.I. Solvent Black 3, 7, 27, 29, or 34; C.I. Solvent Yellow 14, 16, 19, 29, 56, or 82; C.I. Solvent Red 1, 3, 8, 18, 24, 27, 43, 51, 72, 73, 132, or 218; C.I. Solvent Violet 3; C.I. Solvent Blue 2, 5, 11, or 70; C.I. Solvent Green 3 or 7; or C.I. Solvent Orange 2.

In addition, as the fluorescent dye, for example, there may be mentioned C.I. Disperse Red 364, C.I. Disperse Red 362, C.I. Vat Red 41, C.I. Disperse Yellow 232, C.I. Disperse Yellow 184, C.I. Disperse Yellow 82, or C.I. Disperse Yellow 43.

As the reactive dye, for example, there may be mentioned a yellow dye, such as C.I. Reactive Yellow 2, 3, 18, 81, 84, 85, 95, 99, or 102; an orange dye, such as C.I. Reactive Orange 5, 9, 12, 13, 35, 45, or 99; a brown dye, such as C.I. Reactive Brown 2, 8, 9, 17, or 33; a red dye, such as C.I. Reactive Red 1, 3, 4, 13, 15, 24, 29, 31, 33, 120, 125, 151, 206, 218, 226, or 245; a violet dye, such as C.I. Reactive Violet 24; a blue dye, such as C.I. Reactive Blue 2, 5, 10, 13, 14, 15, 15:1, 21, 49, 63, 71, 72, 75, 162, or 176, or C.I. Reactive Blue 4, 19, or 198; a green dye, such as C.I. Reactive Green 5, 8, or 19; or a black dye, such as C.I. Reactive Black 1, 8, 23, or 39.

A lower limit of a content rate of the colorant in the ink jet composition is preferably 0.1 percent by mass, more preferably 0.2 percent by mass, and further preferably 0.3 percent by mass. In addition, an upper limit of the content rate of the colorant in the ink jet composition is preferably 10.0 percent by mass, more preferably 7.0 percent by mass, and further preferably 5.0 percent by mass.

Accordingly, the color development property and optical density of the recorded portion of the recorded matter to be manufactured using the ink jet composition can be made more excellent, and in addition, for example, generation of unfavorable color irregularity in the recorded matter can be more effectively prevented.

At least part of the colorant forming the ink jet composition may be contained in the particles described above, and a colorant not contained in the particles may also be included.

However, a rate of the colorant not contained in the particles to the total colorant included in the ink jet composition is preferably 10 percent on mass basis or less, more preferably 5 percent on mass basis or less, and further preferably 1 percent on mass basis or less.

1-3. Polyester Resin having Sulfo Groups

The ink jet composition of the present disclosure includes a polyester resin having sulfo groups in its molecule. Hereinafter, the polyester resin having sulfo groups in its molecule as described above is also called "sulfo group-containing polyester resin" in some cases. In the recorded matter to be manufactured using the ink jet composition, the sulfo group-containing polyester resin has not only a function to improve the fixing property and fastness of the recorded portion but also a function to improve texture and touch feeling. In addition, the polyester resin described above also has a function to improve a color development property of the colorant. In addition, since having an excellent hydrophilic property, the sulfo group-containing polyester resin has a function to improve the dispersion stability of a solid material in the ink jet composition including water, and as a result, the polyester resin described above also has a function to improve the ejection stability of the ink jet composition.

The polyester is a generic name of a high molecular weight material having an ester bond in its main chain, and in general, the polyester includes a chemical structure formed by dehydration condensation between a polyol component having hydroxy groups in its molecule and a polycarboxylic acid component having carboxy groups in its molecule.

The sulfo group-containing polyester resin preferably has sulfo groups and also includes a diol component and a dicarboxylic acid component. The sulfo group-containing polyester resin may also include, besides the diol component and the dicarboxylic acid component, an at least trivalent polyalcohol component and an at least trivalent polyvalent carboxylic acid component.

The sulfo group may be included in any position in the sulfo group-containing polyester resin and may be included, for example, in the diol component, the dicarboxylic acid component, or the position other than those mentioned above; however, the sulfo group is preferably included in the dicarboxylic acid component. In other words, the sulfo group-containing polyester resin preferably includes a dicarboxylic acid component having a sulfonated chemical structure.

1-3-1. Diol Component

As the diol component forming the sulfo group-containing polyester resin, for example, there may be mentioned an aliphatic diol, such as 1,3-propanediol, methyl propanediol, neopentyl glycol, methyl ethyl propanediol, diethyl propanediol, butyl ethyl propanediol, ethylene glycol, 1,2-propanediol, 2,3-butanediol, 1,4-butanediol, 1,5-pentanediol, 1,6-hexanediol, diethylene glycol, dipropylene glycol, a polyethylene glycol, a polypropylene glycol, or cyclohexanedimethanol; or a compound in which a sulfo group is incorporated in one of the diols mentioned above, and one selected from those diols mentioned above may be used alone, or at least two types thereof may be used in combination.

1-3-2. Dicarboxylic Acid Component

As the dicarboxylic acid component forming the sulfo group-containing polyester resin, a component having at least two carboxy groups in its molecule may be used.

As the dicarboxylic acid component, the sulfo group-containing polyester resin may contain only one type component but preferably contains at least two types of components.

Accordingly, since the amorphousness of the sulfo group-containing polyester resin is enhanced, for example, the crystallization thereof in the ink jet composition or in the recorded portion to be formed using the ink jet composition can be preferably prevented, and a storage stability of the ink jet composition and a reliability of the recorded matter can be made more excellent. In particular, when an aromatic dicarboxylic acid which will be described later is contained as the dicarboxylic acid component, in general, the crystallization as described above is liable to occur; however, since the sulfo group-containing polyester resin contains at least two types of dicarboxylic acid components, while the crystallization is effectively prevented, advantages realized by using the aromatic dicarboxylic acid which will be described later can be obtained.

Although the dicarboxylic acid component forming the sulfo group-containing polyester resin may be an aliphatic dicarboxylic acid, an aromatic dicarboxylic acid is preferably at least contained.

Accordingly, a resin strength can be increased. In addition, for example, a hydrophobic property of the sulfo group-containing polyester resin can be appropriately increased, and even when the ink jet composition is stored, for example, in a high-temperature environment, the sulfo group-containing polyester resin can be effectively prevented from being unfavorably dissolved in a dispersion medium containing water as a primary component. In addition, a water resistance of the recorded matter to be manufactured using the ink jet composition can also be made more excellent. In addition, when the ink jet composition includes a dye as the colorant, an affinity between the sulfo group-containing polyester resin and the colorant can be further enhanced, and the color development property is made particularly excellent. In addition, the colorant can be preferably contained in the particles described above, and the effects as described above can be more significantly obtained.

As the aromatic dicarboxylic acid, for example, there may be mentioned an aromatic dicarboxylic acid, such as terephthalic acid, isophthalic acid, ortho-phthalic acid, 1,5-naphthalene dicarboxylic acid, 2,6-naphthalene dicarboxylic acid, 2,7-naphthalene dicarboxylic acid, or diphenic acid; or a compound in which a sulfo group is incorporated in one of the aromatic dicarboxylic acids mentioned above. Among those mentioned above, terephthalic acid, isophthalic acid, or a compound in which a sulfo group is incorporated therein is preferable.

A lower limit of a rate of the aromatic dicarboxylic acid to all the dicarboxylic acid components forming the sulfo group-containing polyester resin is preferably 0.4 percent on molar basis, more preferably 1.0 percent on molar basis, and further preferably 1.4 percent on molar basis. An upper limit of the rate of the aromatic dicarboxylic acid to all the dicarboxylic acid components forming the sulfo group-containing polyester resin is preferably 20.0 percent on molar basis, more preferably 15.0 percent on molar basis, and further preferably 10.0 percent on molar basis.

Accordingly, the hydrophilic property of the particles described above can be more appropriately adjusted, and the dispersion stability of the particles in the ink jet composition, the storage stability of the ink jet composition, and the color development property of the recorded portion of the recorded matter to be manufactured using the ink jet composition can be made more excellent. In addition, the water resistance, oil resistance, and the like of the recorded matter to be manufactured using the ink jet composition can also be made more excellent.

As the aliphatic dicarboxylic acid, for example, there may be mentioned an aliphatic dicarboxylic acid, such as succinic acid, adipic acid, azelaic acid, sebacic acid, dodecanedicarboxylic acid, fumaric acid, maleic acid, itaconic acid, hexahydrophthalic acid, tetrahydrophthalic acid, or cyclohexanedicarboxylic acid, or a compound in which a sulfo group is incorporated in one of the aliphatic dicarboxylic acids mentioned above.

When the sulfo group-containing polyester resin contains as the dicarboxylic acid, at least two types of components, terephthalic acid, isophthalic acid, and/or a compound in which a sulfo group is incorporated in terephthalic acid or isophthalic acid is preferably contained as the dicarboxylic acid.

Accordingly, although being different from each other, those compounds have the structures similar to each other, and hence, effects such that the compounds are likely to be compatible with each other and the amorphousness is enhanced are obtained.

In the sulfo group-containing polyester resin, a distribution of the sulfo groups in its molecule may be either uniform or non-uniform.

The polyester resin can be preferably synthesized by heating a mixture which contains, for example, an ester compound including a diol component and a dicarboxylic acid component and which also contains, if needed, a component such as a catalyst. As the ester compound of the dicarboxylic acid component, for example, a methyl ester or an ethyl ester may be preferably used. In addition, in a method for manufacturing the polyester resin as described above, when a component containing a sulfo group is used as a part of the monomer component, the sulfo group-containing polyester resin can be manufactured.

A sulfo group-containing polyester resin in which the distribution of the sulfo groups in its molecule is non-uniform may be preferably synthesized by a method in which after a first reaction step of heating a mixture which contains an ester compound including a diol component and a dicarboxylic acid component and which also contains, if needed, a component such as a catalyst is performed, a second reaction step is performed such that a monomer component having a sulfo group is added in the reaction system and then heated. In this case, as the monomer component having a sulfo group, when a dicarboxylic acid component which is not an ester compound is used, the distribution of the sulfo groups in its molecule can be made more preferable.

Although the particles forming the ink jet composition may contain at least one type of sulfo group-containing polyester resin, the particles described above preferably contain sulfo group-containing polyester resins having different sulfo-group content rates.

Accordingly, a rate of the sulfo groups contained in the sulfo group-containing polyester resin and a sulfur atom content contained therein can be easily adjusted. In addition, a distribution of the sulfo groups in the particle can be more preferably realized. In addition, when a polyester resin which has a large number of sulfo groups is used in combination with a polyester resin which has a small number of sulfo groups, which has a high hydrophobic property, and which is more likely to be colored with a colorant, while an increase in viscosity of the ink jet composition is effectively suppressed, the color development property of the recorded portion by the ink jet composition can be made more excellent.

1-3-3. Other Components

The sulfo group-containing polyester resin may have constituent components other than the diol component and the dicarboxylic acid component described above. As the components described above, for example, there may be mentioned an at least trivalent polyalcohol component, an at least trivalent polycarboxylic acid component, a monovalent alcohol component in which one hydroxy group of a diol component is esterified, and/or a monovalent carboxylic acid component in which one carboxy group of a dicarboxylic acid component is esterified.

However, a content rate of the components other than the diol component and the dicarboxylic acid component in the sulfo group-containing polyester resin is preferably 20.0 percent by mass or less, more preferably 10.0 percent by mass or less, and further preferably 5.0 percent by mass or less.

1-3-4. Other Conditions

The sulfo group-containing polyester resin preferably satisfies the following conditions.

The sulfur atom content contained in the sulfo group-containing polyester resin is preferably 0.60 percent by atom or less, more preferably 0.50 percent by atom or less, and further preferably 0.40 percent by atom or less. In addition, a lower limit of the sulfur atom content contained in the sulfo group-containing polyester resin is preferably 0.05 percent by atom, more preferably 0.10 percent by atom, and further preferably 0.15 percent by atom.

Accordingly, while the particles in the ink jet composition are prevented from being dissolved, the viscosity of the ink jet composition can be easily adjusted to a more preferable value. In addition, the water resistance of the recorded portion to be formed using the ink jet composition can be made more excellent.

The sulfur atom content contained in the sulfo group-containing polyester resin can be obtained by an energy dispersive X-ray spectroscopy (EDX). In more particular, by an energy dispersive X-ray spectroscopy to analyze C, N, O, Na, and S atoms, the sulfur atom content contained in the sulfo group-containing polyester resin can be obtained. The energy dispersive X-ray spectroscopy may be performed, for example, using an EDX system of QUANTAX coupled with a desk-top low vacuum scanning electron microscope TM3030 (manufactured by Hitachi Ltd.). The sulfur atom content contained in the sulfo group-containing polyester resin shown in Examples which will be described later is the value obtained by the measurement as described above.

In addition, in this specification, a sulfonation degree of the sulfo group-containing polyester resin indicates a rate of the number of monomers each having a sulfo group to the number of all monomers forming the sulfo group-containing polyester resin.

A lower limit of an acid value of the sulfo group-containing polyester resin is preferably 1.0 KOHmg/g, more preferably 1.5 KOHmg/g, and further preferably 2.0 KOHmg/g. In addition, an upper limit of the acid value of the sulfo group-containing polyester resin is preferably 15.0 KOHmg/g, more preferably 10.0 KOHmg/g, and further preferably 5.0 KOHmg/g.

A lower limit of a number average molecular weight of the sulfo group-containing polyester resin is preferably 1,500, more preferably 3,000, and further preferably 10,000. In addition, an upper limit of the number average molecular weight of the sulfo group-containing polyester resin is preferably 25,000, more preferably 20,000, and further preferably 18,000.

Accordingly, the fixing property of the sulfo group-containing polyester resin to a recording medium and the durability of the recorded matter to be manufactured using the ink jet composition can be simultaneously obtained at a higher level. In addition, the color development property of the colorant on various types of recording media can be made more excellent.

A lower limit of a glass transition temperature of the sulfo group-containing polyester resin is preferably 0° C., more preferably 25° C., and further preferably 40° C. In addition, an upper limit of the glass transition temperature of the sulfo group-containing polyester resin is preferably 90° C., more preferably 75° C., and further preferably 70° C.

Accordingly, the fixing property of the sulfo group-containing polyester resin to a recording medium and the durability of the recorded matter to be manufactured using the ink jet composition can be simultaneously obtained at a higher level.

A lower limit of a content rate of the sulfo group-containing polyester resin in the ink jet composition is preferably 10.0 percent by mass, more preferably 14.0 percent by mass, and further preferably 16.0 percent by mass. In addition, an upper limit of the content rate of the sulfo group-containing polyester resin in the ink jet composition is preferably 47.0 percent by mass, more preferably 45.0 percent by mass, and further preferably 44.0 percent by mass.

When the content rate of the colorant in the ink jet composition and the content rate of the sulfo group-containing polyester resin in the ink jet composition are represented by $X_D$ [percent by mass] and $X_P$ [percent by mass], respectively, a lower limit of $X_P/X_D$ is preferably 4, more preferably 10, and further preferably 15. In addition, an upper limit of $X_P/X_D$ is preferably 300, more preferably 200, and further preferably 100.

Accordingly, the color development property of the recorded portion to be formed using the ink jet composition can be made more excellent. In addition, the fixing property of the recorded portion to a recording medium can be made more excellent, and when the recorded matter manufactured using the ink jet composition is processed by a heat treatment, such as washing/cleaning using hot water, heat drying by a dryer, or ironing, the colorant can be effectively prevented from being unfavorably diffused out of the recorded matter.

At least part of the sulfo group-containing polyester resin forming the ink jet composition may form particles containing the colorant, and the ink jet composition may further contain, for example, particles which contain no colorant and which are formed from the sulfo group-containing polyester resin.

However, a rate of the sulfo group-containing polyester resin configured not to form the particles described above to the total sulfo group-containing polyester resin included in the ink jet composition is preferably 10 percent on mass basis or less, more preferably 5 percent on mass basis or less, and further preferably 1 percent on mass basis or less.

1-4. Water-Soluble Organic Solvent

The ink jet composition may also include a water-soluble organic solvent.

Accordingly, for example, the viscosity of the ink jet composition can be preferably adjusted, and/or a moisture retaining property of the ink jet composition can be enhanced. As a result, liquid-droplet ejection by an ink jet method can be stably performed.

As the water-soluble organic solvent included in the ink jet composition, for example, glycerin, propylene glycol, or 2-pyrrolidone may be mentioned.

When at least one of those solvents is included, an evaporation rate is decreased by an excellent moisture retaining ability, and a more stable liquid-droplet ejection can be performed.

Although a lower limit of a content rate of the water-soluble organic solvent included in the ink jet composition is not particularly limited, the lower limit described above is preferably 0 percent by mass, more preferably 1.0 percent by mass, and further preferably 3.0 percent by mass. In addition, although an upper limit of the content rate of the water-soluble organic solvent included in the ink jet composition is not particularly limited, the upper limit described above is preferably 30.0 percent by mass, more preferably 25.0 percent by mass, and further preferably 20.0 percent by mass.

Accordingly, the effects obtained when the water-soluble organic solvent described above is included can be more significantly obtained.

1-5. Other Components

The ink jet composition may also include components other than those described above. Hereinafter, in this section, the components as described above are also called "other components" in some cases.

As other components, for example, there may be mentioned resin materials other than the sulfo group-containing polyester resin, various types of surfactants, various types of dispersants, an emulsifier, a penetrant, such as triethylene glycol monomethyl ether, triethylene glycol monobutyl ether, diethylene glycol monomethyl ether, 1,2-hexanediol, 1,2-pentanediol, 1,2-butanediol, or 3-methyl-1,5-pentanediol, a drying suppressor such as triethanolamine, a pH adjuster, a chelating agent such as ethylenediaminetetraacetic acid salt, an antiseptic agent/fungicide, and/or an antirust agent. As the antiseptic agent/fungicide, for example, a compound having an isothiazoline ring structure in its molecule may be preferably used.

In addition, when the ink jet composition includes, besides the sulfo group-containing polyester resin, a polyester resin having no sulfo groups as a resin material other than the sulfo group-containing polyester resin, for example, even if the sulfo group-containing polyester resin uniformly contains the sulfo groups in its molecule, the distribution of the sulfo groups in the particle can be preferably realized.

In addition, when the ink jet composition includes a surfactant, wettability of the ink jet composition to a recording medium can be made more preferable, and a more preferable image quality can be advantageously obtained.

As the surfactant included in the ink jet composition, for example, various types of surfactants, such as an anionic surfactant, a cationic surfactant, and a nonionic surfactant, may be used.

In more particular, as the surfactant included in the ink jet composition, for example, an acetylene-based surfactant, a silicone-based surfactant, or a fluorine-based surfactant may be mentioned.

A content rate of one of the other components in the ink jet composition is preferably 6.0 percent by mass or less and more preferably 5.0 percent by mass or less. In addition, when at least two types of components are included as the other components, the total content rate thereof preferably satisfies the above condition.

1-6. Other Conditions

Although a viscosity of the ink jet composition at 25° C. is not particularly limited, the viscosity described above is preferably 9.0 mPa·s or less, more preferably 8.0 mPa·s or less, and further preferably 7.0 mPa·s or less. In addition, although a lower limit of the viscosity of the ink jet composition at 25° C. is not particularly limited, the lower limit described above is preferably 2.0 mPa·s, more preferably 3.0 mPa·s, and further preferably 4.0 mPa·s.

Accordingly, the ejection stability of the ink jet composition can be further improved.

In addition, the viscosity may be measured at 25° C. using a viscoelastic tester, such as MCR-300 manufactured by Pysica, in a manner such that a shear rate is increased from 10 $[s^{-1}]$ to 1,000 $[s^{-1}]$, and a viscosity at a shear rate of 200 $[s^{-1}]$ is read.

Although a lower limit of a surface tension of the ink jet composition at 25° C. is not particularly limited, the lower limit described above is preferably 20 mN/m, more preferably 21 mN/m, and further preferably 23 mN/m. In addition, although an upper limit of the surface tension of the ink jet composition at 25° C. is not particularly limited, the upper limit described above is preferably 50 mN/m, more preferably 40 mN/m, and further preferably 30 mN/m.

Accordingly, for example, nozzle clogging of a recording apparatus by an ink jet method is not likely to be generated, and the ejection stability of the ink jet composition is further improved. In addition, even if the nozzle clogging is generated, the recovery thereof can be made more excellent when the nozzle is capped, that is, when capping is performed on the nozzle.

In addition, as the surface tension, a value measured by Wilhelmy method may be used. Measurement of the surface tension may be performed using a surface tensiometer, such as CBVP-7 (manufactured by Kyowa Interface Science Co., Ltd.).

When the ink jet composition of the present disclosure is an ink, the ink is generally received in a container, such as a cartridge, a bag, or a tank, and is then applied to a recording apparatus by an ink jet method. In other words, a recording apparatus according to the present disclosure includes a container, such as an ink cartridge, to receive the ink jet composition of the present disclosure to be used as the ink.

2. Method for Manufacturing Ink Jet Composition

Next, a method for manufacturing an ink jet composition will be described.

2-1. First Method

The ink jet composition of the present disclosure can be manufactured, for example, by the following first method.

That is, the first method includes an emulsified suspension preparation step of preparing an emulsified suspension by mixing a first composition which contains a sulfo group-containing polyester resin, a colorant, and an organic solvent and a second composition which contains water, and an organic solvent removing step of removing at least part of the organic solvent from the emulsified suspension.

In the first method, first of all, the first composition which contains a sulfo group-containing polyester resin, a colorant, and an organic solvent is prepared.

The first composition may be prepared by simultaneously mixing the components or may be prepared by mixing the components in a stepwise manner.

For example, after a kneaded material of the sulfo group-containing polyester resin and the colorant is prepared, by mixing this kneaded material with the organic solvent, the sulfo group-containing polyester resin and the colorant may be dissolved or dispersed therein.

As the organic solvent, for example, an organic solvent having a solubility in water at 25° C. of 0.1 g to 30 g/100 g of $H_2O$ may be preferably used.

As the organic solvent described above, for example, an ether such as tetrahydrofuran, a ketone, such as methyl ethyl ketone or methyl isopropyl ketone, or an ester, such as ethyl acetate or isopropyl acetate, may be mentioned, and one selected from those mentioned above may be used alone, or at least two types thereof may be used in combination.

In addition, the organic solvent is preferably an organic solvent which dissolves or disperses the sulfo group-containing polyester resin and is also preferably an organic solvent which is likely to be removed in a later step. Hence, an organic solvent having a relatively low boiling point is preferable.

From the points as described above, as the organic solvent, tetrahydrofuran, methyl ethyl ketone, or ethyl acetate is preferable, and tetrahydrofuran or methyl ethyl ketone is more preferable.

In addition, for the preparation of the first composition, components other than the sulfo group-containing polyester resin, the colorant, and the organic solvent may also be used.

As the components described above, for example, a basic compound and/or an emulsifier may be mentioned.

2-1-1. Emulsified Suspension Preparation Step

In the emulsified suspension preparation step, the first composition and the second composition which contains water are mixed together to prepare an emulsified suspension.

The emulsified suspension thus obtained is placed in the state in which a dispersoid including the sulfo group-containing polyester resin, the colorant, and the organic solvent is dispersed in a water-based dispersion medium.

The second composition may at least contain water, and for example, pure water may be used, or a liquid containing another component besides water may also be used. As the component described above, for example, a basic component may be mentioned.

In addition, prior to the mixing between the first composition and the second composition, the basic component may be mixed with the first composition.

As the basic compound, for example, there may be mentioned an inorganic base, such as sodium hydroxide, potassium hydroxide, or ammonia; or an organic base, such as diethylamine, triethylamine, or isopropylamine, and one selected from those mentioned above may be used alone, or at least two types thereof may be used in combination.

Although the mixing between the first composition and the second composition may be performed, for example, by supplying the second composition to the first composition or by supplying the first composition to the second composition, the mixing described above is preferably performed by dripping the second composition to the first composition.

Accordingly, the first composition can be more preferably phase-transfer emulsified, and the particles having the average particle diameter as described above can be more preferably formed.

In addition, the mixing between the first composition and the second composition is preferably performed by supplying the second composition to the first composition while the first composition is stirred.

Accordingly, the first composition can be further preferably phase-transfer emulsified, and the particles having the average particle diameter as described above can be further preferably formed.

A lower limit of a mass rate of the organic solvent to the total amount of the water and the organic solvent in the emulsified suspension when the emulsified suspension preparation step is finished is preferably 15% and more preferably 20%. An upper limit of the mass rate of the organic solvent to the total amount of the water and the organic solvent in the emulsified suspension when the emulsified suspension preparation step is finished is preferably 35% and more preferably 30%.

2-1-2. Organic Solvent Removing Step

In the organic solvent removing step, at least part of the organic solvent is removed from the emulsified suspension.

Accordingly, solid particles which contain the colorant and the sulfo group-containing polyester resin and which correspond to the particles forming the ink jet composition of the present disclosure are formed.

The organic solvent removing step may be performed, for example, by heating the emulsified suspension or by placing the emulsified suspension in a reduced-pressure environment.

A dispersion liquid obtained in the organic solvent removing step in which the solid particles containing the colorant and the sulfo group-containing polyester resin are dispersed in a water-based dispersion medium may be directly used as the ink jet composition of the present disclosure, or the dispersion liquid described above may be used as the ink jet composition of the present disclosure after being mixed with at least one of other components.

In addition, after the organic solvent removing step is performed, a post-treatment step, such as washing and/or drying, may also be performed.

Accordingly, unnecessary components can be removed, and an ink jet composition in which the composition is more reliably prepared can be obtained.

The washing of the particles contained in the dispersion liquid obtained in the organic solvent removing step can be performed in a manner such that after a fine particle cake forming the dispersion liquid was obtained by separation therefrom using a separation device, such as a centrifugal machine, a filter press, or a belt filter, the fine particle cake thus obtained is stirred and dispersed in water and is then further dehydrated.

After the dehydration, if needed, a drying treatment may also be performed.

For the drying treatment, for example, a mixing vacuum dryer, such as a ribocorn type dryer (manufactured by Okawara MFG. Co., Ltd.) or a nauta mixer (manufactured by Hosokawa Micron Corporation); or a fluidized bed dryer, such as a fluidized bed dryer (manufactured by Okawara MFG. Co., Ltd.) or a vibration fluidized bed dryer (manufactured by Chuo Kakohki Co., Ltd.) may be used.

In the case in which the dehydration treatment and the drying treatment are performed, when the washed particles are mixed with other components including at least water, the ink jet composition of the present disclosure described above can be obtained.

In addition, in the organic solvent removing step, at least part of the organic solvent contained in the emulsified suspension, in particular, at least part of the organic solvent contained in the dispersoid of the emulsified suspension, may be removed, and the organic solvent described above is not required to be fully removed. Even in the case as described above, by the post-treatment step, such as washing and/or drying, in general, a remaining organic solvent can be sufficiently removed. In addition, in an ink jet composition to be finally obtained, the organic solvent may remain as long as the amount thereof is small.

2-2. Second Method

The ink jet composition of the present disclosure can be manufactured, for example, by the following second method.

That is, the second method includes a emulsified dispersion preparation step of preparing an emulsified dispersion by mixing a first composition which contains a sulfo group-containing polyester resin and an organic solvent and a second composition which contains water, an organic solvent removing step of removing at least part of the organic solvent from the emulsified dispersion to obtain a water dispersion of the sulfo group-containing polyester resin, and a colorant mixing step of mixing a colorant and the water dispersion of the sulfo group-containing polyester resin with heating so as to incorporate the colorant in particles formed from a material containing the sulfo group-containing polyester resin.

In the second method, first of all, the first composition which contains a sulfo group-containing polyester resin and an organic solvent is prepared.

As the organic solvent, an organic solvent having a boiling point of 90° C. or less at one atmospheric pressure is preferable, and an organic solvent having a boiling point of 80° C. or less is more preferable.

Accordingly, the organic solvent can be preferably removed in the following organic solvent removing step, and an excessive organic solvent is preferably prevented from remaining in an ink jet composition to be finally obtained.

As the organic solvent described above, for example, an ether such as tetrahydrofuran, a ketone, such as methyl ethyl ketone or methyl isopropyl ketone, or an ester, such as ethyl acetate or isopropyl acetate, may be mentioned, and one selected from those mentioned above may be used alone, or at least two types thereof may be used in combination.

In addition, for the preparation of the first composition, components other than the sulfo group-containing polyester resin and the organic solvent may also be used.

As the components described above, for example, a basic compound and/or an emulsifier may be mentioned.

2-2-1. Emulsified Dispersion Preparation Step

In the emulsified dispersion preparation step, the first composition and the second composition which contains water are mixed together to prepare an emulsified dispersion.

The emulsified dispersion thus obtained is placed in the state in which a dispersoid including the sulfo group-containing polyester resin and the organic solvent is dispersed in a water-based dispersion medium.

The second composition may at least contain water, and for example, pure water may be used, or a liquid containing another component besides water may also be used. As the component described above, for example, a basic component may be mentioned.

In addition, prior to the mixing between the first composition and the second composition, the basic component may be mixed with the first composition.

As the basic compound, for example, there may be mentioned an inorganic base, such as sodium hydroxide, potassium hydroxide, or ammonia; or an organic base, such as diethylamine, triethylamine, isopropylamine, triethanolamine, or tripropanolamine. One selected from those mentioned above may be used alone, or at least two types thereof may be used in combination.

Although the mixing between the first composition and the second composition may be performed, for example, by supplying the second composition to the first composition or by supplying the first composition to the second composition, the mixing described above is preferably performed by dripping the second composition to the first composition.

Accordingly, the first composition can be more preferably phase-transfer emulsified, and the particles having the average particle diameter as described above can be more preferably formed.

In addition, the mixing between the first composition and the second composition is preferably performed by supplying the second composition to the first composition while the first composition is stirred.

Accordingly, the first composition can be further preferably phase-transfer emulsified, and the particles having the average particle diameter as described above can be further preferably formed.

This step may be performed, for example, by heating at a temperature of the boiling point of the organic solvent or less.

Accordingly, for example, the sulfo groups can be preferably localized in the vicinity of the surface of the dispersoid including the sulfo group-containing polyester resin and the organic solvent, and in a later step, the particles in each of which the sulfo groups are localized in the vicinity of the surface can be preferably formed.

A lower limit of a mass rate of the organic solvent to the total amount of the water and the organic solvent in the emulsified dispersion when the emulsified dispersion preparation step is finished is preferably 20% and more preferably 23%. An upper limit of the mass rate of the organic solvent to the total amount of the water and the organic solvent in the emulsified dispersion when the emulsified dispersion preparation step is finished is preferably 35% and more preferably 30%.

2-2-2. Organic Solvent Removing Step

In the organic solvent removing step, at least part of the organic solvent is removed from the emulsified dispersion.

Accordingly, solid particles containing the sulfo group-containing polyester resin are formed, and a water dispersion of the sulfo group-containing polyester resin is obtained.

Although the organic solvent removing step can be performed, for example, by heating the emulsified dispersion or by placing the emulsified dispersion in a reduced-pressure environment, the organic solvent removing step is preferably performed by at least heating the emulsified dispersion.

Accordingly, the sulfo groups can be preferably localized in the vicinity of the surface of the solid particle containing the sulfo group-containing polyester resin, and particles which are contained in the ink jet composition to be finally obtained and in each of which the sulfo groups are localized in the vicinity of the surface can be more preferably formed.

In this step, when the emulsified dispersion is heated, the heating is preferably performed at a heating temperature higher than the boiling point of the organic solvent and lower than the boiling point of water.

In addition, in the organic solvent removing step, at least part of the organic solvent contained in the emulsified dispersion, in particular, at least part of the organic solvent contained in the dispersoid of the emulsified dispersion, may be removed, and the organic solvent described above is not required to be fully removed. Even in the case as described above, in a later step, a remaining organic solvent can be sufficiently removed. In addition, in the ink jet composition to be finally obtained, the organic solvent may remain as long as the amount thereof is small.

2-2-3. Colorant Mixing Step

In the colorant mixing step, the water dispersion of the sulfo group-containing polyester resin is mixed with the colorant so that the colorant is incorporated in the particles formed from the material containing the sulfo group-containing polyester resin.

In order to efficiently incorporate the colorant in the particles formed from the material containing the sulfo group-containing polyester resin, this step is performed with heating.

A lower limit of a heating temperature in this step is preferably 40° C., more preferably 45° C., and further preferably 50° C. In addition, an upper limit of the heating temperature in this step is preferably 100° C., more preferably 98° C., and further preferably 95° C.

A lower limit of a heating time in this step is preferably 5 minutes, more preferably 10 minutes, and further preferably 20 minutes. In addition, an upper limit of the heating time in this step is preferably 300 minutes, more preferably 240 minutes, and further preferably 180 minutes.

The heating in this step is preferably performed while a mixture of the water dispersion of the sulfo group-containing polyester resin and the colorant is stirred.

In addition, in this step, at least one component other than the colorant may also be mixed with the water dispersion of the sulfo group-containing polyester resin together with the colorant.

The mixing with the water dispersion of the sulfo group-containing polyester resin may be performed in a stepwise manner.

In addition, after the colorant mixing step is performed, a post-treatment step, such as washing and/or drying, may also be performed.

Accordingly, unnecessary components can be removed, and an ink jet composition in which the composition is more reliably prepared can be obtained.

The washing of the particles contained in a dispersion liquid obtained in the colorant mixing step can be performed in a manner such that after a fine particle cake forming the dispersion liquid is obtained by separation therefrom using a separation device, such as a centrifugal machine, a filter press, or a belt filter, the fine particle cake thus obtained is stirred and dispersed in water and is then further dehydrated.

After the dehydration, if needed, a drying treatment may also be performed.

For the drying treatment, for example, a mixing vacuum dryer, such as a ribocorn type dryer (manufactured by Okawara MFG. Co., Ltd.) or a nauta mixer (manufactured by Hosokawa Micron Corporation); or a fluidized bed dryer, such as a fluidized bed dryer (manufactured by Okawara MFG. Co., Ltd.) or a vibration fluidized bed dryer (manufactured by Chuo Kakohki Co., Ltd.) may be used.

In the case in which the dehydration treatment and the drying treatment are performed, when the washed particles are mixed with other components including at least water, the ink jet composition of the present disclosure described above can be obtained.

3. Ink Jet Recording Method

Next, an ink jet recording method of the present disclosure will be described.

The ink jet recording method of the present disclosure includes an ejection step of ejecting the ink jet composition according to the present disclosure by an ink jet method.

By the method described above, the liquid-droplet ejection by an ink jet method can be stably performed, and hence, an ink jet recording method which is preferably applied to manufacturing of a recorded matter having a recorded portion excellent in color development property can be provided. In particular, an excellent color development property can be obtained on various types of recording media. In addition, the fixing property and the adhesion strength of the recorded portion to be formed using the ink jet composition can be made excellent.

The ink jet recording method of the present disclosure preferably further includes, after the ejection step, a heating step of heating a recording medium to which the ink jet composition is adhered.

Accordingly, the color development property of the recorded portion and the fixing property thereof to the recording medium are further improved.

3-1. Ejection Step

In the ejection step, by an ink jet method, the ink jet composition is ejected and is applied to the recording medium. The ejection of the ink jet composition by an ink jet method can be performed by a known ink jet recording apparatus. As an ejection method, for example, a piezoelectric method or a method in which an ink is ejected by a bubble thereof generated by heating may be used. In particular, for example, since the ink jet composition is not likely to be deteriorated, a piezoelectric method is preferable.

In the ejection step, at least two types of the ink jet composition according to the present disclosure may be used. In more particular, for example, at least two types of ink jet compositions which include colorants having different compositions and/or content rates may be used in combination.

In addition, in the ejection step, an ink other than the ink jet composition according to the present disclosure may also be used in combination.

3-2. Recording Medium

Although a constituent material of the recording medium is not particularly limited, for example, there may be mentioned a resin material, such as a polyurethane, a polyethylene, a polypropylene, a polyester, a polyamide, or an acrylic resin; paper, such as cardboard, regular paper, or ink jet exclusive paper; glass, metal, ceramic, leather, wood, china, concrete, or fibers formed from at least one of those mentioned above; and various types of natural fibers, synthetic fibers, and semi-synthetic fibers formed from silk, wool, cotton, hemp, a polyester, a polyamide (nylon), an acrylic resin, a polyurethane, a cellulose, a linter, a rayon, a cupra, and an acetate. One selected from those mentioned above may be used alone, or at least two types thereof may be used in combination. In addition, as the recording medium, a medium having a three-dimensional structure, such as a sheet shape, a spherical shape, or a rectangular parallelepiped shape, may also be used.

When the recording medium is formed from a material containing a polyester, adhesion between the recording medium and the recorded portion formed using the ink jet composition of the present disclosure can be made more excellent.

In particular, the recording medium is preferably a cloth.

Although dyeing of clothes has a large demand for printed T-shirts and the like, and in addition, thermal transfer printing by ironing or the like has been spreading, a recorded matter in which a recorded portion is provided on the cloth as described above has been required to have a comfortable texture, in particular, such as smoothness, flexibility, and softness, and the recorded portion is also required to have durability and the like. According to the present disclosure, the requirements as described above can be satisfied. Hence, when the recording medium is a cloth, the effects according to the present disclosure can be more significantly obtained.

As the cloth, for example, various types of weaves, such as a plain weave, a twill weave, a stain weave, a change plain weave, a change twill weave, a change stain weave, a change weave, a pattern weave, a single weave, a double weave, a multi weave, a warp pile weave, a weft pile weave, and a leno weave may be mentioned.

In addition, the thickness of the fibers forming the cloth may be set, for example, to 10 to 100 deniers (d).

As the fibers forming the cloth, for example, there may be mentioned polyester fibers, nylon fibers, triacetate fibers, diacetate fibers, polyamide fibers, cellulose fibers, or blended fibers using at least two types of fibers mentioned above. In addition, for example, blended fibers between at least one type of those fibers mentioned above and regenerated fibers, such as rayon fibers, or natural fibers, such as cotton, silk, or wool, may also be used.

In addition, as the recording medium, a film to be used while being bent and/or stretched is also preferably used. Accordingly, for example, effects of the present disclosure such that a recorded portion having not only a low tacking property and an excellent texture but also excellent elasticity and adhesion to the recording medium can be formed are more significantly obtained.

3-3. Heating Step

In this embodiment, after the ejection step described above is performed, the recording medium to which the ink jet composition is applied is heated.

Although a lower limit of a heating temperature of the recording medium in this step is not particularly limited, the lower limit described above is preferably 100° C., more preferably 105° C., and further preferably 110° C. In addition, although an upper limit of the heating temperature of the recording medium in this step is not particularly limited, the upper limit described above is preferably 160° C., more preferably 155° C., and further preferably 150° C.

Accordingly, the effects obtained by providing the heating step as described above can be more significantly achieved. In addition, energy required to manufacture the recorded matter can be reduced, and the productivity of the recorded matter can be further improved. In addition, the heating step may also be applied to a recording medium having a relatively low heat resistance, and the range of selection of the recording medium can be further widened. In addition, an unfavorable change in color, the change in optical density, and the like can be preferably prevented which are caused, for example, by heating, such as washing/cleaning using hot water, heating/drying by a dryer, or a heat treatment by ironing or the like, to be performed after the recorded matter is manufactured. In addition, when the heating temperature in this step is in the range described above, the texture of the recorded portion can be effectively prevented from being degraded.

Although depending on the heating temperature of the recording medium in this step, a lower limit of a heating time of the recording medium in this step is preferably 0.2 seconds, more preferably 1 second, and further preferably 5 seconds. In addition, an upper limit of the heating time of the recording medium in this step is preferably 300 seconds, more preferably 60 seconds, and further preferably 30 seconds.

Accordingly, the effects obtained by providing the heating step as described above can be more significantly achieved. In addition, energy required to manufacture the recorded matter can be reduced, and the productivity of the recorded matter can be further improved. In addition, the heating step may also be applied to a recording medium having a relatively low heat resistance, and the range of selection of the recording medium can be further widened. In addition, an unfavorable change in color, the change in optical density, and the like can be preferably prevented which are caused, for example, by heating, such as washing/cleaning using hot water, heating/drying by a dryer, or a heat treatment by ironing or the like, to be performed after the recorded matter is manufactured. In addition, when the heating time in this step is in the range described above, the texture of the recorded portion can be effectively prevented from being degraded.

In addition, this step may be performed such that the heating is performed in the state in which a surface of the recording medium to which the ink jet composition is adhered is apart from a heating member or may be performed such that the heating is performed in the state in which the recording medium to which the ink jet composition is adhered is in close contact with the heating member.

The heating step may be simultaneously performed with the ejection step. In more particular, for example, the recording medium to which the ink jet composition is to be applied is heated in advance, and after the ink jet composition is brought into contact with the recording medium, a heat treatment may also be performed. In this case, for example, before and after the ink jet composition is applied to the recording medium, the heating may be continuously performed, or after the heating of the recording medium to which the ink jet composition is to be applied is interrupted, the heating may be again started.

4. Recording Apparatus

Next, a recording apparatus will be described.

FIGURE is a schematic perspective view of a recording apparatus of a preferable embodiment.

In the following description, as the recording apparatus, an on-carriage type printer in which an ink cartridge is mounted on a carriage will be described by way of example. In this embodiment, the recording apparatus is not limited to an on-carriage type printer and may also be, for example, an off-carriage type printer in which an ink cartridge is fixed outside.

In addition, the printer functioning as a recording apparatus described below is a serial printer in which an ink jet head for recording is mounted on a carriage configured to be transferred in a predetermined direction, and in association with the transfer of the carriage, the ink jet head is transferred so as to eject liquid droplets on a recording medium. The recording apparatus in the present disclosure is not limited to a serial printer and may also be, for example, a line printer. The line printer is a printer in which an ink jet head is formed wider than a width of a recording medium, and liquid droplets are ejected on the recording medium while the ink jet head is not transferred.

In the drawing used for illustration, in order to recognize individual members, the scales thereof are appropriately changed.

A recording apparatus 1 includes an ink jet head 2 to eject the ink jet composition of the present disclosure described above to a recording medium M by an ink jet method and performs the ink jet recording method of the present disclosure described above.

Accordingly, a recording apparatus capable of preferably manufacturing a highly durable recorded matter which has a recorded portion excellent in texture can be provided.

In particular, the recording apparatus 1 shown in FIGURE includes the ink jet head 2, an ink cartridge 3, a carriage 4, a platen 5, a heating mechanism 6, a carriage transfer mechanism 7, a medium transport mechanism 8, a guide rod 9, a linear encoder 10, and a control portion CONT.

The control portion CONT controls operations of the entire recording apparatus 1.

The carriage 4 mounts the ink jet head 2 which will be described later and detachably mounts the ink cartridge 3 to supply the ink jet composition to the ink jet head 2.

The platen 5 is disposed at a lower side of the ink jet head 2, and the recording medium M is transported thereby.

The heating mechanism 6 heats the recording medium M. As described above, since the heating mechanism 6 to heat the recording medium M is provided, a recorded portion formed by the ink jet composition can be preferably fixed to the recording medium M. In particular, without using an apparatus other than the recording apparatus 1, the recorded portion can be preferably fixed.

The carriage transfer mechanism 7 transfers the carriage 4 in a medium width direction of the recording medium M.

The medium transport mechanism 8 transports the recording medium M in a medium transport direction. In this case, the medium width direction is a main scanning direction which is a scanning direction of the ink jet head 2. The medium transport direction is a direction orthogonal to the main scanning direction and is a sub-scanning direction in which the recording medium M is transported.

The ink jet head 2 is a device to adhere the ink jet composition to the recording medium M and includes, at a surface facing the recording medium M to which the ink is to be adhered, a plurality of nozzles (not shown) to eject the ink jet composition. Those nozzles are disposed in lines so as to form a nozzle surface at a nozzle plate surface.

As a method to eject the ink jet composition from a nozzle, for example, there may be mentioned a piezoelectric method in which a pressure and a recording information signal are simultaneously applied to the ink jet composition by a piezoelectric element, and liquid droplets of the ink jet composition are ejected and recorded.

In FIGURE, the ink cartridge 3 to supply the ink jet composition to the ink jet head 2 is formed of four independent cartridges. In the four cartridges, for example, different types of ink jet compositions are filled. The ink cartridge 3 is detachably mounted to the ink jet head 2. Although the number of the cartridges is four in the example shown in FIGURE, the number of the cartridges is not limited thereto, and a desired number of cartridges may be mounted.

The carriage 4 is fitted so as to be held by the guide rod 9 which is a support member provided in the main scanning direction and is transferred in the main scanning direction along the guide rod 9 by the carriage transfer mechanism 7.

In the example shown in FIGURE, although the carriage 4 is transferred in the main scanning direction, the transfer thereof is not limited thereto, and the carriage 4 may also be transferred, besides in the main scanning direction, in the sub-scanning direction.

The heating mechanism 6 may be provided at any position as long as the recording medium M can be heated. In the example shown in FIGURE, the heating mechanism 6 is provided above the platen 5 and at a position facing the ink jet head 2. When the heating mechanism 6 is provided at a position facing the ink jet head 2, a position of the recording medium M to which the ink jet composition is adhered can be reliably heated, and the ink jet composition adhered to the recording medium M can be efficiently dried.

As the heating mechanism 6, for example, there may be mentioned a print heater mechanism to heat the recording medium M by a heat source to be brought into contact therewith, a mechanism to radiate infrared rays or microwaves which are electromagnetic waves having a maximum wavelength of approximately 2,450 MHz, or a dryer mechanism to blow a hot wind.

Various conditions, such as a heating timing, a heating temperature, and a heating time, of the heating of the recording medium M by the heating mechanism 6 are controlled by the control portion CONT.

Besides the heating mechanism 6, the recording apparatus 1 may have a second heating mechanism (not shown). In this case, the second heating mechanism is provided downstream of the heating mechanism 6 in the transport direction of the recording medium M. Accordingly, the drying property of the ink jet composition adhered to the recording medium M is improved. As the second heating mechanism, one of the mechanisms described in the heating mechanism 6 may be used.

The linear encoder 10 detects a signal of a position of the carriage 4 on the main scanning direction. The signal detected by the linear encoder 10 is transmitted as the position information to the control portion CONT. The control portion CONT recognizes a scanning position of the ink jet head 2 based on the position information transmitted from the linear encoder 10 and controls a recording operation, that is, an ejection operation and the like, by the ink jet head 2. In addition, the control portion CONT is configured to be able to perform a variable control of a transfer rate of the carriage 4.

5. Recorded Matter

Next, a recorded matter according to the present disclosure will be described.

The recorded matter according to the present disclosure has a recorded portion formed using the ink jet composition according to the present disclosure described above.

Accordingly, a recorded matter having a recorded portion excellent in color development property can be provided. In addition, the fixing property and the adhesion strength of the recorded portion to the recording medium can be made excellent.

As the recording medium, one of the media described above may be preferably used.

Heretofore, although preferable embodiments of the present disclosure have been described, the present disclosure is not limited thereto.

For example, the ink jet composition of the present disclosure may be used as a composition to be ejected by an ink jet method and may be not a composition to be applied to the method as described above.

In addition, for example, the ink jet composition of the present disclosure may also be a composition to be applied to a method further including other steps besides the steps as described above.

In the case described above, as a pre-treatment step, for example, a step of applying a coating layer to the recording medium may be mentioned.

In addition, as an intermediate treatment step, for example, a step of pre-heating the recording medium may be mentioned.

In addition, as a post-treatment step, for example, a step of washing the recording medium may be mentioned.

In addition, the ink jet composition of the present disclosure may be manufactured by any method and is not limited to that manufactured by the method described above. For example, the ink jet composition of the present disclosure may contain, as the particles containing the colorant and the sulfo group-containing polyester resin, particles formed by an emulsion polymerization method.

EXAMPLES

Next, concrete Examples of the present disclosure will be described.
6. Synthesis of Polyester Resin Synthetic Example A1

After dimethyl terephthalate, dimethyl isophthalate, sodium dimethyl 5-sulfoisophthalate, ethylene glycol, neopentyl glycol, and tetrabutyl titanate were charged at a predetermined ratio in an autoclave equipped with a thermometer and a stirrer, heating was performed at 180° C. to 230° C. for 120 minutes, so that an ester exchange reaction was performed. Next, after the temperature of the reaction system was increased to 250° C., and the pressure in the system was reduced to 1 to 10 mmHg, a reaction was performed for 60 minutes, so that a sulfo group-containing polyester resin was obtained.

The result of an NMR analysis of the sulfo group-containing polyester resin thus obtained showed that 55 percent by mole of ethylene glycol and 45 percent by mole of neopentyl glycol were contained as a diol component, and 50 percent by mole of terephthalic acid, 45 percent by mole of isophthalic acid, and 5 percent by mole of sodium 5-sulfoisophthalic acid were contained as a dicarboxylic acid component. In addition, the number average molecular weight of the sulfo group-containing polyester resin was 3,500, and the glass transition temperature thereof was 58° C. In addition, the sulfur atom content of the sulfo group-containing polyester resin obtained in this synthetic example was 0.25 percent by atom by an energy dispersive X-ray analysis.

Synthetic Examples A2 and A3

Except for that the charge amounts of the raw materials were changed, a sulfo group-containing polyester resin was synthesized in a manner similar to that of the above Synthetic Example A1. In addition, the sulfur atom content of the sulfo group-containing polyester resin obtained in Synthetic Example A2 was 0.40 percent by atom by an energy dispersive X-ray analysis, and the sulfur atom content of the sulfo group-containing polyester resin obtained in Synthetic Example A3 was 0.80 percent by atom by an energy dispersive X-ray analysis.

Synthetic Example A4

Except for that sodium dimethyl 5-sulfoisophthalate was not used, and the charge amounts of the raw materials other than that were changed, a polyester resin was synthesized in a manner similar to that of the above Synthetic Example A1. The polyester resin obtained in this synthetic example had no sulfo groups in its molecule and contained no sulfur atoms.
7. Preparation of Ink Jet Composition Example 1

After 80.0 parts by mass of the sulfo group-containing polyester resin synthesized in Synthetic Example A1 and 20.0 parts by mass of the sulfo group-containing polyester resin synthesized in Synthetic Example A2 were dissolved in 200.0 parts by mass of tetrahydrofuran at 60° C. in a one-liter three-neck flask equipped with a stirring device and a reflux cooling tube, 400.0 parts by mass of ion exchange water was added thereto and then stirred at 600 rpm for 10 minutes, so that an emulsified dispersion was obtained.

Subsequently, the emulsified dispersion was heated to 100° C. with stirring to evaporate tetrahydrofuran, so that a water dispersion of the sulfo group-containing polyester resin at a concentration of 40 percent by mass was obtained.

Next, 3.0 parts by mass of C.I. Disperse Red 60 which was a sublimation dye used as the colorant, 30.1 parts by mass of distilled water, 5.0 parts by mass of propylene glycol, 5.0 parts by mass of Silface SAG503A manufactured by Nisshin Chemical Industry Co., Ltd., and 0.2 parts by mass of triethanolamine were added to 100.0 parts by mass of the water dispersion of the sulfo group-containing polyester resin at a concentration of 40 percent by mass obtained as described above and were then stirred at 90° C. for 2 hours, so that an ink jet composition containing 30.0 percent by mass of a solid content in the form of colored fine particles was obtained.

Examples 2 to 6

Except for that the types and blending amounts of the individual components were changed to have the compositions shown in Table 1, ink jet compositions were prepared in a manner similar to that of the above Example 1.

Comparative Examples 1 and 2

Except for that the types and blending amounts of the individual components were changed to have the compositions shown in Table 1, ink jet compositions were prepared in a manner similar to that of the above Example 1.

Comparative Example 3

Except for that the types and blending amounts of the individual components were changed to have the composition shown in Table 1, and the amount of tetrahydrofuran was changed from 200 parts by mass to 400 parts by mass, an ink jet composition was prepared in a manner similar to that of the above Example 1.
8. Evaluation
8-1. Ejection Stability After the ink jet compositions of the above Examples and Comparative Examples were each filled in a cartridge of a recording apparatus PX-M860F (manufactured by Seiko Epson Corporation) and then set therein, whole surface solid patterns were printed on 10 sheets of A4-size MCPW paper (manufactured by Toppan Forms Co., Ltd.), and after 30 minutes passed, whole surface solid patterns were again printed on 10 sheets of MCPW paper (manufactured by Toppan Forms Co., Ltd.). Immediately after the printing, a nozzle missing pattern of a printer driver standard was printed, and the number of missing nozzles was counted and then evaluated in accordance with the following criteria. As the number of missing nozzles is smaller, the ejection stability is regarded as superior.

AA: number of missing nozzles is 0.
A: number of missing nozzles is 1 to 9.
B: number of missing nozzles is 10 to 35.
C: number of missing nozzles is 36 or more.

8-2. Color Development Property

After the ink jet compositions of the above Examples and Comparative Examples were each printed on MCPW paper (manufactured by Toppan Forms Co., Ltd.) functioning as a recording medium in a regular paper standard mode using a recording apparatus M105 (manufactured by Seiko Epson Corporation), an optical density (OD) value of a printed portion was measured using a colorimeter (Gretag Macbeth Spectrolin, manufactured by X-rite) and then evaluated in accordance with the following criteria. As the optical density is higher, the color development property is regarded as superior.

AA: OD value is 1.3 or more.
A: OD value is 1.1 to less than 1.3.
B: OD value is 0.9 to less than 1.1.
C: OD value is less than 0.9.

The structures of the ink jet compositions of the above Examples and Comparative Examples and the above evaluation results thereof are collectively shown in Table 1. In addition, in the table, the sulfo group-containing polyester resins synthesized in Synthetic Examples A1, A2, and A3 are represented by "A1", "A2", and "A3", respectively; the polyester resin synthesized in Synthetic Example A4 is represented by "A4"; C.I. Disperse Red 60 and C.I. Solvent Blue 5 are represented by "DR60" and "SB5", respectively; propylene glycol is represented by "PG", Silface SAG503A manufactured by Nisshin Chemical Industry Co., Ltd. is represented by "SAG503A2, and triethanolamine is represented by "TEA". In the column of the average particle diameter in the table, the value of the average particle diameter obtained by measurement using a zeta-potential/particle diameter measurement system ELSZ-1000ZS (manufactured by Otsuka Electronics Co., Ltd.) is shown. In addition, in the column of the viscosity in the table, the result obtained such that a shear rate is increased from 10 [s$^{-1}$] to 1,000 [s$^{-1}$] at 25° C. using a viscoelastic tester MCR-300 (manufactured by Pysica), and a viscosity at a shear rate of 200 [s$^{-1}$] is read is shown. In addition, the ink jet compositions of the above Examples all had a surface tension in a range of 23 to 30 mN/m. In addition, the surface tension is measured at 25° C. using a surface tensiometer (CBVP-7, manufactured by Kyowa Interface Science Co., Ltd.) by Wilhelm method. In addition, the sulfo group-containing polyester resins included in the ink jet compositions of the above Examples all had an acid value in a range of 1.0 to 15.0 KOHmg/g, a number average molecular weight in a range of 1,500 to 20,000, and a glass transition temperature in a range of 40° C. to 80° C.

TABLE 1

| STRUCTURE OF INK JET COMPOSITION | CONTENT OF CONSTITUENT COMPONENT (PARTS BY MASS) | | | EXAMPLE 1 | EXAMPLE 2 | EXAMPLE 3 | EXAMPLE 4 | EXAMPLE 5 |
|---|---|---|---|---|---|---|---|---|
| | | POLYESTER RESIN | A1 | 32.0 | 12.8 | 3.2 | 32.0 | 15.2 |
| | | | A2 | 8.0 | 3.2 | 12.8 | 8.0 | 0.8 |
| | | | A3 | — | — | — | — | — |
| | | | A4 | — | — | — | — | — |
| | | COLORANT | DR60 | 3.0 | 2.0 | 2.0 | — | — |
| | | | SB5 | — | — | — | 3.0 | 2.0 |
| | | PG | | 5.0 | 5.0 | 5.0 | 5.0 | 5.0 |
| | | SAG503A | | 5.0 | 5.0 | 5.0 | 5.0 | 5.0 |
| | | TEA | | 0.2 | 0.2 | 0.2 | 0.2 | 0.2 |
| | | WATER | | 90.1 | 90.1 | 90.1 | 90.1 | 90.1 |
| | CONDITION OF PARTICLES CONTAINING POLYESTER AND COLORANT | CONTENT RATE (PERCENT BY MASS) | | 30.0 | 15.2 | 15.2 | 30.0 | 15.2 |
| | | AVERAGE PARTICLE DIAMETER [nm] | | 71 | 70 | 68 | 70 | 7 |
| EVALUATION RESULT | VISCOSITY [mPa · s] | | | 4.8 | 3.0 | 6.2 | 4.9 | 5.2 |
| | EJECTION STABILITY | | | AA | AA | AA | AA | AA |
| | COLOR DEVELOPMENT PROPERTY | | | AA | A | B | AA | A |

| | | | | EXAMPLE 6 | COMPARATIVE EXAMPLE 1 | COMPARATIVE EXAMPLE 2 | COMPARATIVE EXAMPLE 3 |
|---|---|---|---|---|---|---|---|
| STRUCTURE OF INK JET COMPOSITION | CONTENT OF CONSTITUENT COMPONENT (PARTS BY MASS) | POLYESTER RESIN | A1 | — | 8.0 | — | 32.0 |
| | | | A2 | — | 2.0 | — | 8.0 |
| | | | A3 | 16.0 | — | — | — |
| | | | A4 | — | — | 40.0 | — |
| | | COLORANT | DR60 | — | 1.5 | — | 3.0 |
| | | | SB5 | 2.0 | — | 3.0 | — |
| | | PG | | 5.0 | 5.0 | 5.0 | 5.0 |
| | | SAG503A | | 5.0 | 5.0 | 5.0 | 5.0 |
| | | TEA | | 0.2 | 0.2 | 0.2 | 0.2 |

TABLE 1-continued

| | | | | | | |
|---|---|---|---|---|---|---|
| | CONDITION OF PARTICLES CONTAINING POLYESTER AND COLORANT | WATER | 90.1 | 90.1 | 90.1 | 90.1 |
| | | CONTENT RATE (PERCENT BY MASS) | 15.2 | 10.3 | 30.0 | 30.0 |
| | | AVERAGE PARTICLE DIAMETER [nm] | 82 | 66 | 75 | 170 |
| | VISCOSITY [mPa·s] | | 20.1 | 3.2 | 32.0 | 3.5 |
| EVALUATION RESULT | EJECTION STABILITY | | B | AA | C | B |
| | COLOR DEVELOPMENT PROPERTY | | A | C | A | C |

As apparent from Table 1, according to Examples of the present disclosure, excellent results can be obtained. On the other hand, according to Comparative Examples, satisfactory results cannot be obtained.

By using a cotton cloth as the recording medium and a PX-M860F (manufactured by Seiko Epson Corporation) as the recording apparatus, a recorded matter was formed by a heat treatment at 150° C. for 5 seconds performed such that an iron as a heating member was brought into contact with a surface side of the recording medium to which the ink jet composition was applied and was then evaluated in a manner similar to that in the above "8-2", and a result similar to that described above was obtained. Furthermore, except for that the heating temperature in the heating step was changed in a range of 100° C. to 160° C., and the heating time was changed in a range of 0.2 to 300 seconds, a recorded matter was manufactured in a manner similar to that described above and was then evaluated in a manner similar to that of the above "8-2", and a result similar to that described above was obtained.

What is claimed is:

1. An ink jet composition comprising:
   water;
   a polyester resin having sulfo groups; and
   a colorant,
   wherein the colorant is contained in particles formed from a material containing the polyester resin,
   the particles contain at least two types of polyester resins having different sulfo-group content rates, and
   the particles have an average particle diameter of 100 nm or less and are contained in the ink jet composition at a content rate of 15 percent by mass or more.

2. The ink jet composition according to claim 1, wherein the ink jet composition has a viscosity of 9.0 mPa·s or less at 25° C.

3. The ink jet composition according to claim 1, wherein the colorant includes at least one selected from the group consisting of a sublimation dye, an oil dye, and a dispersive dye.

4. The ink jet composition according to claim 1, wherein the polyester resin has a sulfur atom content of 0.60 percent by atom or less.

5. An ink jet recording method comprising:
   an ejection step of ejecting the ink jet composition according to claim 1 by an ink jet method.

6. The ink jet recording method according to claim 5, further comprising, after the ejection step:
   a heating step of heating a recording medium to which the ink jet composition is adhered.

7. The ink jet recording method according to claim 6, wherein the recording medium has a temperature of 100° C. to 160° C. in the heating step.

* * * * *